United States Patent
Uchida et al.

(10) Patent No.: US 7,640,090 B2
(45) Date of Patent: Dec. 29, 2009

(54) ACTIVE HEADREST OF A VEHICLE THAT ROTATES HORIZONTALLY AND MOVES LATERALLY BASED ON ANGLE AND DIRECTION OF INERTIA FORCE CAUSED BY REAR-IMPACT

(75) Inventors: Kiyoyuki Uchida, Konan (JP); Yuichi Tanaka, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 102 days.

(21) Appl. No.: 12/048,537

(22) Filed: Mar. 14, 2008

(65) Prior Publication Data

US 2008/0228359 A1 Sep. 18, 2008

(30) Foreign Application Priority Data

Mar. 15, 2007 (JP) .............................. 2007-067166

(51) Int. Cl.
- *G06F 17/00* (2006.01)
- *G06F 7/00* (2006.01)
- *G05D 1/00* (2006.01)
- *B60R 22/00* (2006.01)
- *E05F 15/00* (2006.01)
- *G05D 3/00* (2006.01)

(52) U.S. Cl. .................. 701/49; 297/61; 297/216.1; 297/216.2; 297/216.11; 297/216.12; 297/216.13; 297/216.14; 297/216.15; 297/216.16; 297/406; 297/408; 297/409

(58) Field of Classification Search ............. 701/49
See application file for complete search history.

(56) References Cited

U.S. PATENT DOCUMENTS

| | | | |
|---|---|---|---|
| 6,196,579 B1 * | 3/2001 | Bowers et al. ............. 280/735 |
| 6,478,373 B1 * | 11/2002 | Hake et al. ............. 297/216.13 |
| 6,692,071 B2 * | 2/2004 | Fowler .................. 297/216.12 |
| 6,962,392 B2 * | 11/2005 | O'Connor .................... 297/61 |
| 7,213,884 B2 * | 5/2007 | Flory et al. ................. 297/398 |
| 7,237,842 B2 * | 7/2007 | Schmuda von Trzebiatowski et al. ..... 297/391 |
| 7,264,313 B2 * | 9/2007 | Clough ........................ 297/407 |
| 7,429,082 B2 * | 9/2008 | Kraft et al. .................. 297/408 |
| 7,478,828 B2 * | 1/2009 | Heuschmid et al. ....... 280/730.1 |
| 2006/0043776 A1 * | 3/2006 | Rajasingham ............ 297/216.1 |
| 2006/0279114 A1 * | 12/2006 | Toda et al. ............. 297/216.12 |
| 2007/0027599 A1 * | 2/2007 | Sakai et al. .................... 701/49 |
| 2007/0251749 A1 * | 11/2007 | Breed et al. ................. 180/273 |
| 2009/0121526 A1 * | 5/2009 | Akaike et al. .......... 297/216.12 |

FOREIGN PATENT DOCUMENTS

DE 603 01 591 T2 6/2006

(Continued)

*Primary Examiner*—Thomas G Black
*Assistant Examiner*—Sze-Hon Kong
(74) *Attorney, Agent, or Firm*—Oblon, Spivak, McClelland, Maier & Neustadt, L.L.P.

(57) ABSTRACT

A headrest control apparatus includes: a headrest moving mechanism that supports a headrest in such a manner that at least one of a rotation of the headrest about an axis of the headrest, which extends in the vehicle-height direction, and a movement of the headrest in the vehicle-width direction is permitted; a drive unit that causes at least one of the rotation and the movement of the headrest; and a control unit that controls the drive unit.

4 Claims, 9 Drawing Sheets

FOREIGN PATENT DOCUMENTS

| | | |
|---|---|---|
| DE | 10 2005 051 423 B3 | 3/2007 |
| JP | 3-92156 | 9/1991 |
| JP | 2003-191778 | 7/2003 |
| JP | 2005-87650 | 4/2005 |
| JP | 2005-335616 | 12/2005 |
| JP | 2006-212322 | 8/2006 |
| JP | 2007-30717 | 2/2007 |

* cited by examiner

REGULAR CONDITION  OPERATED CONDITION

IMMEDIATELY AFTER COLLISION

WHEN IT IS DETERMINED THAT COLLISION IS UNAVOIDABLE

ACTIVE HEADREST OF A VEHICLE THAT ROTATES HORIZONTALLY AND MOVES LATERALLY BASED ON ANGLE AND DIRECTION OF INERTIA FORCE CAUSED BY REAR-IMPACT

INCORPORATION BY REFERENCE

The disclosure of Japanese Patent Application No. 2007-67166 filed on Mar. 15, 2007 including the specification, drawings and abstract is incorporated herein by reference in its entirety.

BACKGROUND OF THE INVENTION

1. Field of the Invention

The invention relates to a headrest control apparatus, a headrest control method and an active headrest which move a headrest to prepare for a rear-end collision with a subsequent vehicle.

2. Description of the Related Art

A headrest apparatus for a vehicle, which includes a headrest that holds a passenger's head and that is fitted to a top end portion of a seat back, is described in, for example, Japanese Patent Application Publication No. 2003-191778 (JP-A-2003-191778). The headrest apparatus for a vehicle described in JP-A-2003-191778 further includes front holding means for moving a head holding portion of the headrest toward the front of a vehicle so that the passenger's head is held at a position closer to the front of the vehicle and therefore prevented from moving rearward in the event of a rear-end collision. Furthermore, the headrest apparatus includes upper-side portion forward tilting means for causing an upper side portion of the head holding portion to travel for a longer distance than the lower side portion thereof does when the head holding portion is moved toward the front of the vehicle.

However, the direction of an inertia force applied to the passenger's head at the time of an actual rear-end collision is not always the rearward direction which is parallel to the longitudinal axial direction of the vehicle. This is because the direction of an inertia force applied to the passenger's head varies depending on the manner in which the host vehicle is rear-ended by the subsequent vehicle, the steering angle of the host vehicle (the vehicle which is rear-ended by the subsequent vehicle), etc. Nevertheless, such variation in the direction of an inertial force applied to the passenger's head is not taken into account in the configuration of the headrest apparatus described in JP-A-2003-191778.

SUMMARY OF THE INVENTION

The invention provides a headrest control apparatus, a headrest d control method and an active headrest that move a headrest in an appropriate manner selected based on the direction of an inertia force applied to the passenger's head when a rear-end collision occurs.

A first aspect of the invention relates to a headrest control apparatus. The headrest control apparatus includes: a headrest moving mechanism that supports a headrest, provided in a host vehicle, in such a manner that at least one of a rotation of the headrest about an axis of the headrest, which extends in the vehicle-height direction, and a movement of the headrest in the vehicle-width direction is permitted; a drive unit that causes at least one of the rotation and the movement of the headrest; and a control unit that controls the drive unit.

A second aspect of the invention relates to an active headrest. The active headrest includes: a headrest moving mechanism that supports a headrest, provided in a host vehicle, in such a manner that at least one of a rotation of the headrest about an axis of the headrest, which extends in the vehicle-height direction, and a movement of the headrest in the vehicle-width direction is permitted; and a drive unit that causes at least one of the rotation and the movement of the headrest.

A third aspect of the invention relates to a headrest control method. The headrest control method includes: supporting a headrest, provided in a host vehicle, in such a manner that at least one of a rotation of the headrest about an axis of the headrest, which extends in the vehicle-height direction, and a movement of the headrest in the vehicle-width direction is permitted; causing at least one of the rotation and the movement of the headrest; and controlling at least one of the rotation and the movement of the headrest.

The above-described aspects of the invention provide the headrest control apparatus, the headrest control method and the active headrest that move the headrest in an appropriate manner selected based on the direction of an inertia force applied to the passenger's head when a rear-end collision occurs.

BRIEF DESCRIPTION OF THE DRAWINGS

The foregoing and further objects, features and advantages of the invention will become apparent from the following description of an embodiment with reference to the accompanying drawings, wherein the same or corresponding portions will be denoted by the same reference numerals and wherein.

DETAILED DESCRIPTION OF THE EMBODIMENT

Hereafter, an embodiment of the invention will be described with reference to the accompanying drawings.

Figure 1:
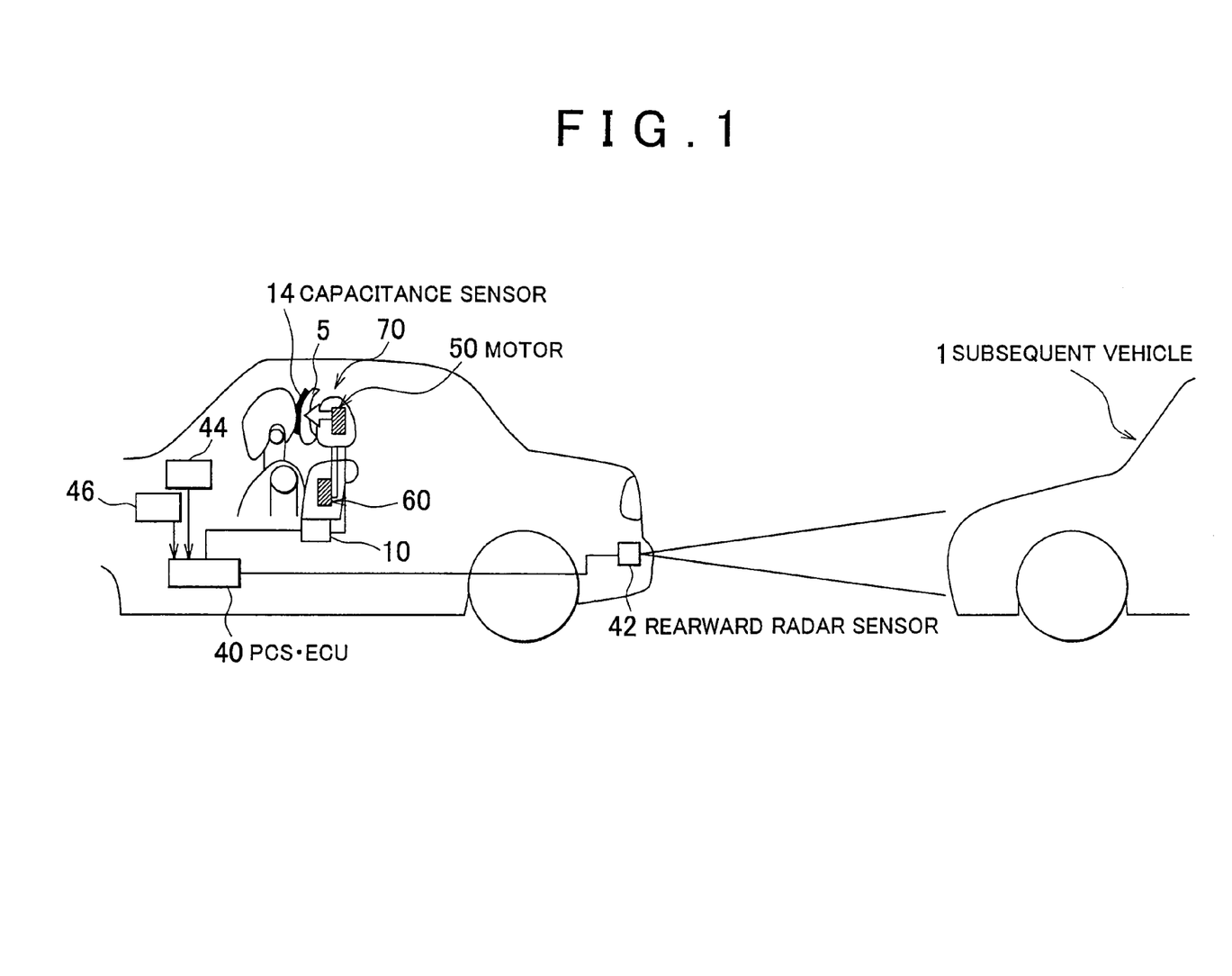
FIG. 1 is a system configuration view showing a headrest control apparatus according to an embodiment of the invention.
Figure 2:
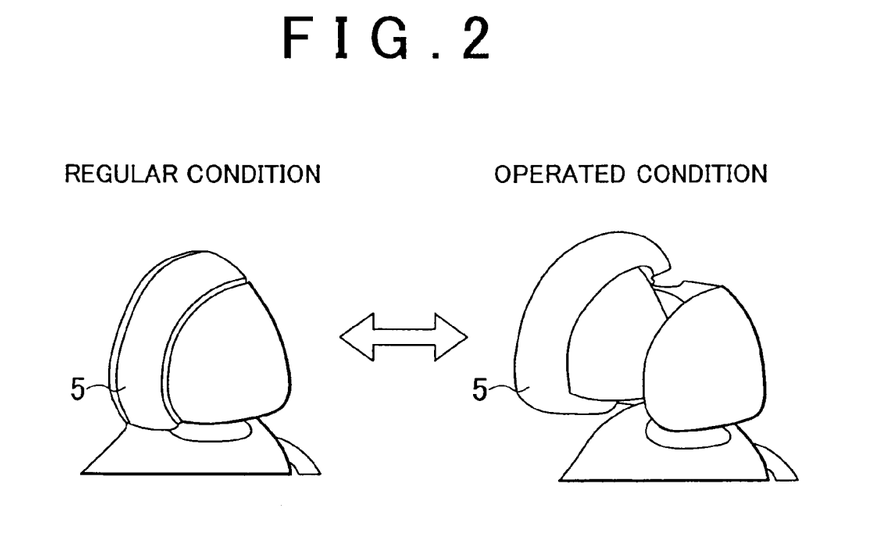
FIG. 2 is a view showing a headrest under the regular condition and the headrest that has been moved toward the front of the vehicle.
Figure 3:
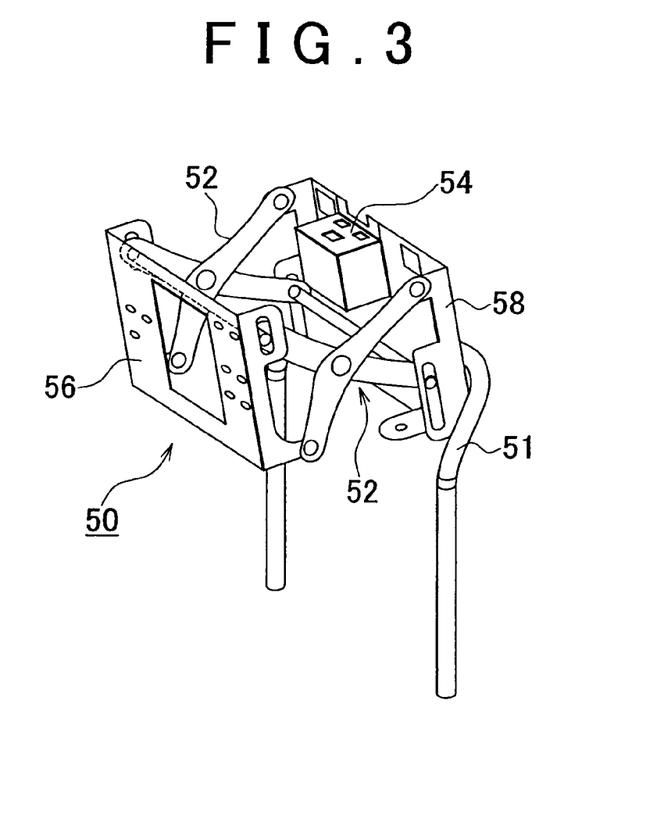
FIG. 3 is a perspective view showing an example of a headrest forward/rearward moving mechanism of an active headrest.
Figure 4:
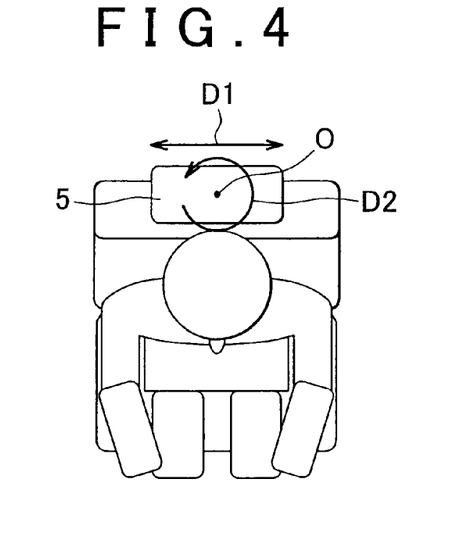
FIG. 4 is a top view of the headrest, which shows the manner in which the headrest is moved by a headrest rotating mechanism of the active headrest.
Figure 5:
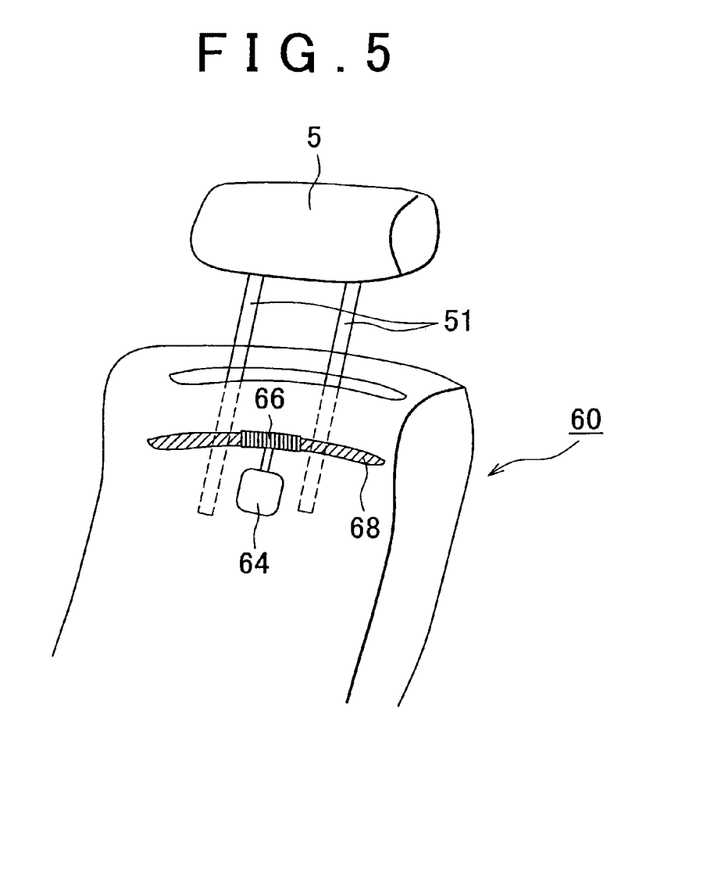
FIG. 5 is a perspective view showing an example of the headrest rotating mechanism of the active headrest.
Figure 6:
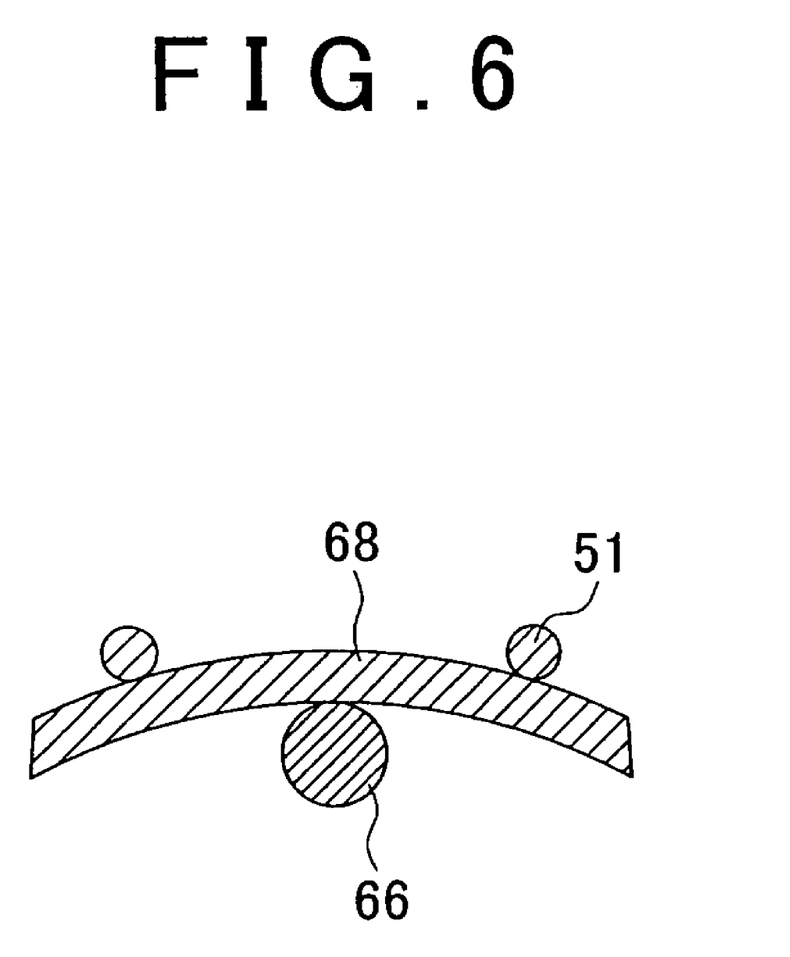
FIG. 6 is a top view schematically showing the headrest rotating mechanism in FIG. 5.
Figure 7:
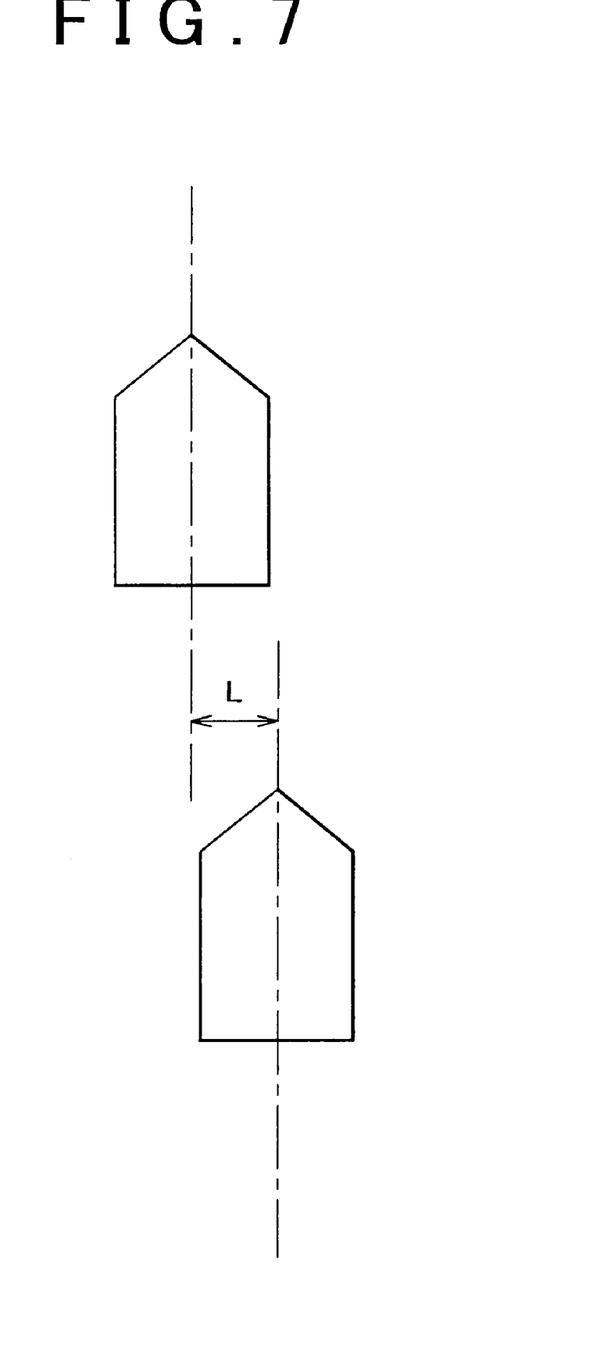
FIG. 7 is a view showing the deviation L of the central axis of a subsequent vehicle from the central axis of a host vehicle in the vehicle-width direction.

FIG. 1 is a system configuration view showing a headrest control apparatus according to an embodiment of the invention. In FIG. 1, main components of the headrest control apparatus are shown in a side view of a vehicle. FIG. 2 is a view showing a headrest 5 under the normal condition (in the retracted position) and the headrest 5 that has been moved toward the front of the vehicle (in the forward-moved position). FIG. 3 is a perspective view showing an example of a headrest forward/rearward moving mechanism 50 of an active headrest 70. FIG. 4 is a top view of the headrest 5, which shows the manner in which the headrest 5 is moved by a headrest rotating mechanism 60 of the active headrest 70. FIG. 5 is a perspective view showing an example of the headrest rotating mechanism 60 of the active headrest 70. FIG. 6 is a top view schematically showing the headrest rotating mechanism 60 in FIG. 5.

The headrest control apparatus according to the embodiment of the invention includes an electric control unit 10 (hereinafter, referred to as "headrest control ECU 10"), which is a main component of the headrest control apparatus and which controls the operation of the active headrest 70. Like other ECUs, the headrest control ECU 10 is formed of a microcomputer that includes a CPU, ROM, RAM, etc. that are connected to each other via a bus (not shown).

The active headrest 70 includes the headrest 5, the headrest forward/rearward moving mechanism 50 (shown in FIG. 3), and the headrest rotating mechanism 60 (shown in FIG. 5). The headrest forward/rearward moving mechanism 50 includes a headrest motor 54, and the headrest rotating mechanism 60 includes a headrest motor 64.

Like commonly used headrests, the headrest 50 is fitted to an upper portion of a seat, at a position corresponding to the passenger's head, and holds the passenger's head from behind.

As shown in FIG. 2, the headrest forward/rearward moving mechanism 50 supports the headrest 5 in a manner such that the headrest 5 is movable in the longitudinal direction of the vehicle. The movement of the headrest 5 in the longitudinal direction of the vehicle is caused by a reversible actuator (e.g. the headrest motor 54 that may rotate in either the forward direction or the reverse direction) under the control of the headrest control ECU 10. The headrest 5 shown in FIG. 2 is structured to move in the direction oblique to the longitudinal direction of the vehicle. Alternatively, the headrest 5 may be structured to move only in the longitudinal direction of the vehicle.

In an example shown in FIG. 3, the headrest forward/rearward moving mechanism 50 includes stays 51, a stationary support member 58, a pair of right and left X-shaped arms (X-shaped links) 52, and a movable support member 56. The stationary support member 58 is fixed to the upper ends of the stays 51. The movable support D member 56 is supported by the stationary support member 58 via the X-shaped arms 52 in such a manner that the movable support member 56 is movable in the longitudinal direction of the vehicle with respect to the stationary support member 58. As shown in FIG. 2, the movable support member 56 is covered with a cushion member that directly contacts the back of the passenger's head, whereby the headrest 5 is formed. In addition, the X-shaped arms 52 are connected to an output shaft of the headrest motor 54 via a gear (not shown) so as to extend and contract in accordance with an operation of the headrest motor 54. Thus, the X-shaped arms 52 extend or contract in accordance with the rotation of the headrest motor 54 in the forward or reverse direction, whereby the headrest 5 is moved in the longitudinal direction of the vehicle. The distance toward the front of the vehicle traveled by the headrest 5 may be variable in accordance with the operation amount of the headrest motor 54. In addition, the speed at which the headrest 5 travels toward the front of the vehicle may be variable in accordance with the operation speed (in other words, rotational speed) of the headrest motor 54. The headrest forward/rearward moving mechanism is not limited to the headrest forward/rearward moving mechanism 50 that uses the X-shaped arm mechanism shown in FIG. 3. The headrest forward/rearward moving mechanism may be implemented by using a rack-and-pinion mechanism, a ball screw nut mechanism, or the like.

The headrest rotating mechanism 60 supports the headrest 5 in such a manner that the headrest 5 is rotatable about its axis that extends in the vehicle-height direction, and/or the headrest 5 is movable in the vehicle-width direction. Namely, as schematically shown in FIG. 4, the headrest rotating mechanism 60 supports the headrest 5 in such a manner that at least one of the movement D1 of the headrest 5 along the vehicle-width direction and the rotation D2 of the headrest 5 about its axis that extends in the vehicle-height direction (the direction perpendicular to the sheet on which FIG. 4 is drawn) is allowed. The axis of the rotation D2 need not be located at the center of the headrest 5 in the lateral direction thereof shown in FIG. 4, and may be set at a position that is offset rightward or leftward from the center of the headrest 5 in the lateral direction thereof. In addition, the axis of the rotation D2 need not extend in the vehicle-height direction, and may be tilted at a sharp angle with respect to the vehicle-height direction. The movement D1 and the rotation D2 are caused by a reversible actuator (e.g. the headrest motor 64 that may rotate in either the forward direction or the reverse direction) that serves as a drive power source under the control of the headrest control ECU 10.

The headrest rotating mechanism 60 shown in FIGS. 5 and 6 is provided within a seat back (seat back rest), and includes a pinion gear 66 and a rack 68. The rack 68 is in an arc-shape and fixed to the stays 51. The pinion gear 66 forms an output gear of the headrest motor 64. With this structure, the rack 68 moves while drawing an arc-shaped trail in accordance with the forward or reverse rotation of the headrest motor 64. As a result, the position of the headrest 5 in the vehicle-width direction (the position of the headrest 5 in the lateral direction of the vehicle) and the orientation of the headrest 5 are changed. The headrest rotating mechanism is not limited to the headrest rotating mechanism 60 that uses the rack-and-pinion mechanism shown in FIG. 5. The headrest rotating mechanism may be implemented by another mechanism, for example, the combination of a slide mechanism and a pivot mechanism. The headrest rotating mechanism 60 shown in FIGS. 4, 5, and 6 is fitted to lower end portions of the stays 51, and supports the lower end portions of the stays 51 in such a manner that the stays 51 are rotatable in the rotational direction of the pinion gear 66 and movable in the vehicle-width direction. However, the headrest rotating mechanism is not limited to this headrest rotating mechanism 60. For example, the headrest rotating mechanism may be provided between the stationary support member 58 and the stays 51, and may support the stationary support member 58 in such a manner that the stationary support member 58 is rotatable in the rotational direction of the pinion gear 66 and movable in the vehicle-width direction. In addition, the position of the headrest 5 in the vehicle-width direction and the orientation of the headrest 5 may be controlled independently of each other by respective actuators.

Referring again to FIG. 1, a capacitance sensor 14 is connected to the headrest control ECU 10. The capacitance sensor 14 is embedded in, for example, the headrest 5. The capacitance sensor 14 is arranged in a predetermined area of the headrest 5. The sensing area of the capacitance sensor 14 may be set so as to cover the reachable area of the headrest 5. The reachable area is an area at which the headrest 5 is expected to contact the back of the passenger's head when the headrest 5 holds the back of the passenger's head. The capacitance sensor 14 outputs an electrical signal indicating the amount of capacitance between the headrest 5 and the passenger's head at a portion that faces the reachable area of the headrest 5. The signal output from the capacitance sensor 14 is transmitted to the headrest control ECU 10.

The headrest control ECU 10 is connected to a PCS (pre-crash system) ECU 40 via an appropriate bus, for example, CAN (controller area network). The PCS ECU 40 determines whether a rear-end collision between the host vehicle and a subsequent vehicle is unavoidable.

A rearward radar sensor 42 is connected to the PCS ECU 40. The rearward radar sensor 42 uses radio waves (for example, millimeter waves), optical waves (for example, laser waves), or ultra sound waves as detection waves, and detects the state of a moving body behind the host vehicle using the detection waves. Usually, the rearward moving body behind the host vehicle is a subsequent vehicle that may cause a rear-end collision. The following description will be provided on the assumption that the moving body behind the host vehicle is a subsequent vehicle. The rearward radar sensor 42 detects the information regarding the positional relationship between the host vehicle and the subsequent vehicle, for example, the relative speed, the relative distance, and the orientation of the subsequent vehicle with respect to the host vehicle at predetermined time intervals. When a millimeter wave radar sensor is used as the rearward radar sensor 42, for example, an electronic scan-type millimeter wave radar may be employed as the millimeter wave radar sensor. If the electric scan type millimeter wave radar is used, the relative speed of the subsequent vehicle with respect to the host vehicle is detected by using Doppler frequency (frequency shift) of the radio wave, the relative distance of the subsequent vehicle with respect to the host vehicle is detected based on the time lag between emission of a wave and reception of a reflected wave, and the orientation of the subsequent vehicle with respect to the host vehicle is detected based on the phase difference between the waves received by multiple receiving antennas. The orientation of the subsequent vehicle with respect to the host vehicle may be detected as the deviation L of the central axis of the subsequent vehicle from the central axis of the host vehicle in the vehicle-width direction of the host vehicle. These detected data are sent to the PCS ECU 40 at predetermined time intervals.

The PCS ECU 40 monitors the relative relationship of the host vehicle to the subsequent vehicle (e.g. the relative speed, the relative distance, and the orientation of the host vehicle with respect to the subsequent vehicle) based on the information from the rearward radar sensor 42, and determines whether a collision between the host vehicle and the subsequent vehicle (in other words, a rear-end collision) is unavoidable. Various determination methods for determining whether a front-end collision between the host vehicle and a preceding vehicle is unavoidable have been suggested. The determination logics of these methods may be employed. For example, when there is a subsequent vehicle that is approaching the host vehicle, if the time to collision (=relative distance/relative speed) between the host vehicle and the subsequent vehicle becomes equal to or shorter than a predetermined value and the deviation L of the central axis of the subsequent vehicle from the central axis of the host vehicle in the vehicle-width direction of the host vehicle becomes equal to or smaller than a predetermined value, the PCS ECU 40 may determine that a collision is unavoidable.

When the PCS ECU 40 determines that a collision is unavoidable, the PCS ECU 40 turns a rear-end collision prediction flag from "False (Off)" to "True (On)" (sets the rear-end collision prediction flag). The PCS ECU 40 continues to monitor the relative relationship of the host vehicle to the subsequent vehicle, after the PCS ECU 40 determines that a collision is unavoidable. When the PCS ECU 40 determines that a collision between the host vehicle and the subsequent vehicle becomes avoidable, the rear-end collision prediction flag is turned off.

A steering angle sensor 44 and vehicle speed sensors 46 are connected to the PCS ECU 40. The steering angle sensor 44 is fitted to, for example, a steering column, and detects the steering angle Ha of the steering wheel. The vehicle speed sensors 46 are provided to the respective wheels and detect the vehicle speed Vs. The data detected by the steering angle sensor 44 and the vehicle speed sensor 46 are sent to the PCS ECU 40 at predetermined time intervals.

When the PCS ECU 40 determines that a collision is unavoidable, the PCS ECU 40 predicts the direction of the inertia force F applied to a passenger in the vehicle, especially to the passenger's head at the time of a rear-end collision. The direction of the inertia force F is predicted based on the information currently received and/or the information received up to the moment immediately before a collision from the rearward radar sensor 42, the steering angle sensor 44, etc.

Figure 8:
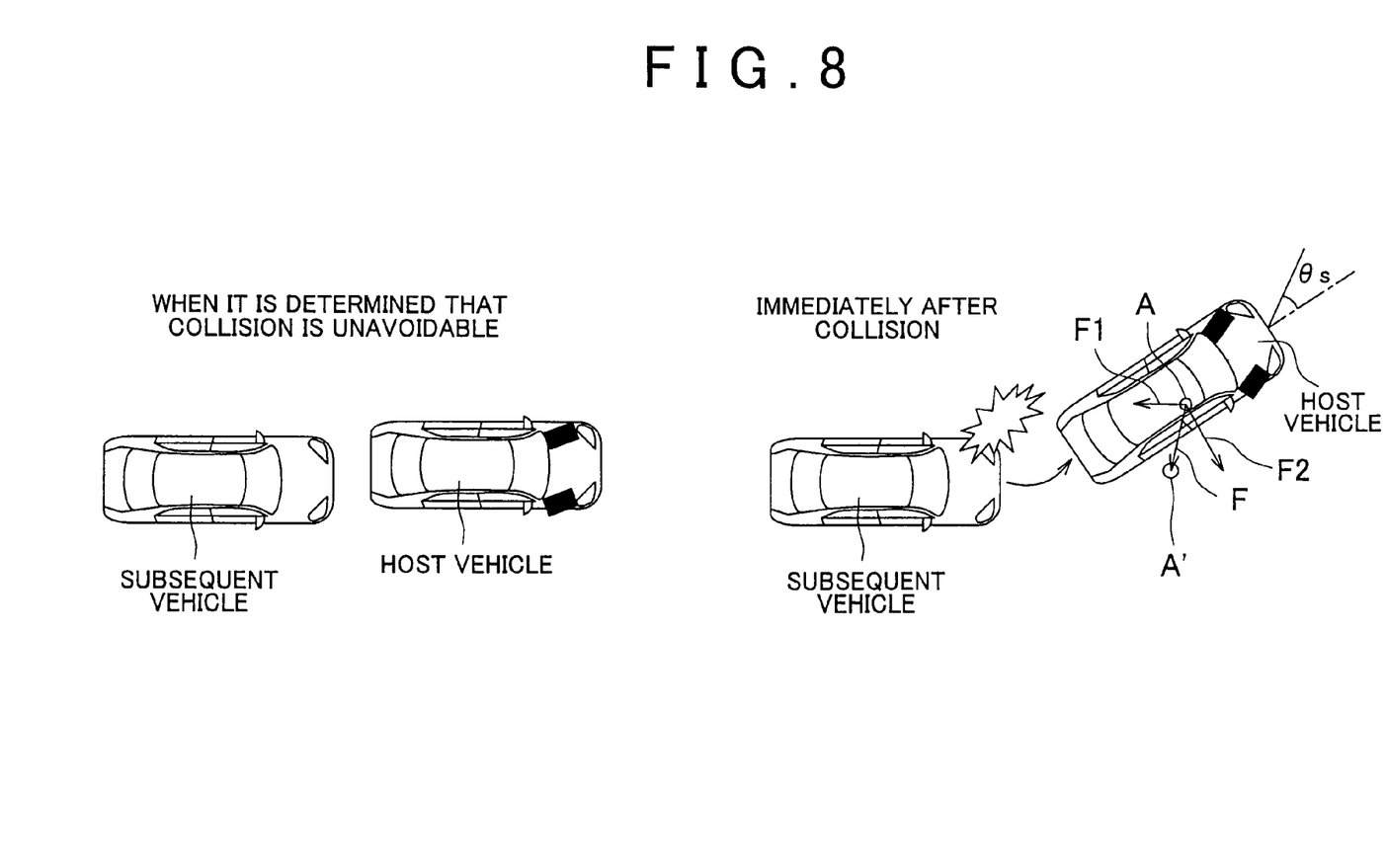
FIG. 8 is a view showing an example of a method for predicting the direction of an inertia force.

FIG. 8 is a view showing an example of a method for predicting the direction of the inertia force F. The left-hand view shows the state when the PCS ECU 40 determines that a collision is unavoidable, and the right-hand view shows the state immediately after a collision occurs. The following description will be provided on the assumption that the steering angle of the host vehicle is not zero as shown in the left-hand view. The right-hand view shows the position A of the driver's head in the host vehicle immediately after a collision. In addition, the right-hand view shows the position A' of the passenger's head immediately after a collision, if the steering angle of the vehicle immediately before the collision is zero.

The direction of the inertia force F applied to the passenger in the vehicle, especially to the passenger's head at the time of a rear-end collision may be predicted or calculated as the direction from the passenger's head position A toward the passenger's head position A'. The passenger's head position A is the position of the passenger's head when the PCS ECU 40 determines that a collision is unavoidable, and the passenger's head position A' is the position of the passenger's head immediately after the collision occurs if the steering angle of the vehicle immediately before the collision is zero. The direction of the inertia force F may be derived by experiments or calculation in advance by using, as parameters, the relative speed of the host vehicle with respect to the subsequent vehicle (or the vehicle speed of the subsequent vehicle), the orientation of the host vehicle with respect to the subsequent vehicle (the deviation L in the vehicle-width direction), the steering angle Ha, and vehicle speed Vs. Then, the direction of the inertia force F may be stored in memory. If the direction of the inertia force F is stored in the memory, the PCS ECU 40 may read the direction of the inertia force corresponding to each of the parameters detected by the sensors 42 and 44.

Alternatively, as shown in the right-hand view in FIG. 8, the direction of the inertia force F applied to the passenger in the vehicle at the time of a collision may be simply predicted or calculated as the direction that corresponds to the angle θs that is formed between the direction in which the host vehicle is traveling and the longitudinal axis of the vehicle. The angle θs may be calculated according to the formula, θs=Ha/η. In this formula, η is the overall gear ratio of the vehicle (the ratio of the steering angle Ha to the steered angle of the wheel).

Alternatively, as shown in the right-hand view in FIG. 8, the direction of the inertia force F applied to the passenger in the vehicle at the time of a rear-end collision may be predicted or calculated as the resultant force of the impact force F1 applied at the time of a rear-end collision and the centrifugal force F2. The impact force F1 may be calculated by using the relative speed of the host vehicle with respect to the subsequent vehicle (or the vehicle speed of the subsequent vehicle) and the orientation of the host vehicle with respect to the subsequent vehicle as parameters. The centrifugal force F2 may be calculated by using the relative speed of the host vehicle with respect to the subsequent vehicle (or the vehicle speed of the subsequent vehicle), the steering angle Ha, and the vehicle speed Vs of the host vehicle as parameters.

After the PCS ECU 40 predicts the direction of the inertia force F that is applied to the passenger in the vehicle at the time of a rear-end collision as described above, the PCS ECU 40 calculates the target control values for the position of the headrest 5 in the vehicle-width direction and orientation of the headrest 5 based on the result of prediction.

Figure 9:
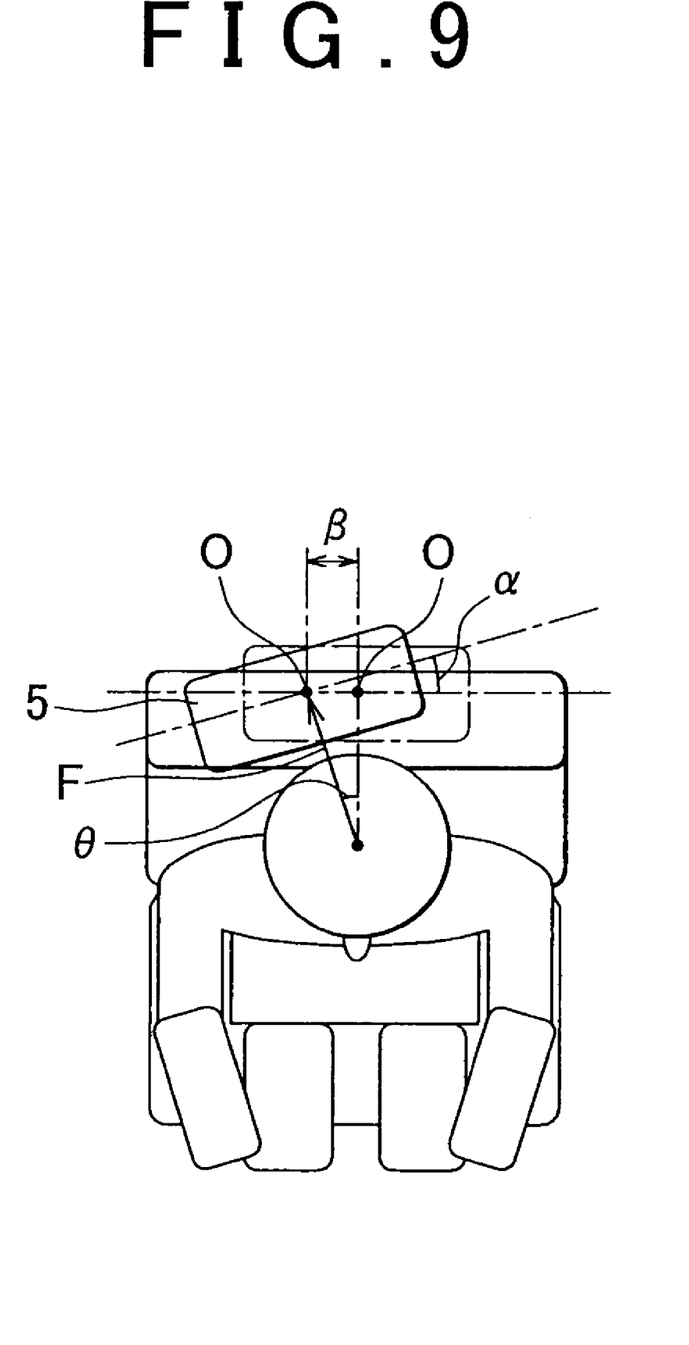
FIG. 9 is a view showing an example of a method for calculating target control values for the position of the headrest in the vehicle-width direction and the orientation of the headrest.

FIG. 9 is a view showing an example of a method for calculating the target control value for the position of the headrest in the vehicle-width direction and the orientation of the headrest. In FIG. 9, the headrest 5 in the regular condition (normal condition) is indicated by the dashed line, and the headrest 5, of which the position in the vehicle-width direction and the orientation have been changed, is indicated by the solid line.

The target control values for the position of the headrest 5 in the vehicle-width direction and the orientation of the headrest 5 are set to values at which the passenger's head is held and protected most effectively if the passenger's head moves in the predicted direction in which the inertia force F is applied. For example, as shown in FIG. 9, the target control value for the position of the headrest 5 in the vehicle-width direction is the movement amount P of the headrest 5 from the regular position of the headrest 5 in the vehicle-width direction (the rightward movement amount is indicated by a positive value). In this case, the target control value β may be set in such a manner that the center position O of the headrest 5 in the lateral direction thereof is located on line extending in the predicted direction in which the inertia force is applied. In addition, the target control value for the orientation of the headrest 5 may be the angle α by which the orientation of the headrest 5 is changed from the regular orientation. In this case, the target control value α (an amount of change in the counterclockwise direction is indicated by a positive value) may be set so as to correspond to the angle θ (an amount of change in the counterclockwise direction is indicated by a positive value) between the predicted direction of the inertia force F and the longitudinal axis of the vehicle. As in the case of the headrest rotating mechanism 60 shown in FIG. 5, in the case where the position of the headrest 5 in the vehicle-width direction and the orientation of the headrest 5 cannot be controlled independently of each other, priority may be given to either one of the position of the headrest 5 in the vehicle-width direction and the orientation of the headrest 5 when the target control values are set.

After the PCS ECU 40 calculates the target control values for the position of the headrest 5 in the vehicle-width direction and the orientation of the headrest 5 as described above, the calculated target control values are provided to the headrest control ECU 10. The headrest control ECU 10 controls the rotational angle of the headrest motor 64 of the headrest rotating mechanism 60 based on the target control values. Thus, the position of the headrest 5 in the vehicle-width direction and the orientation of the headrest 5 that correspond to the target control values are achieved.

Figure 10:
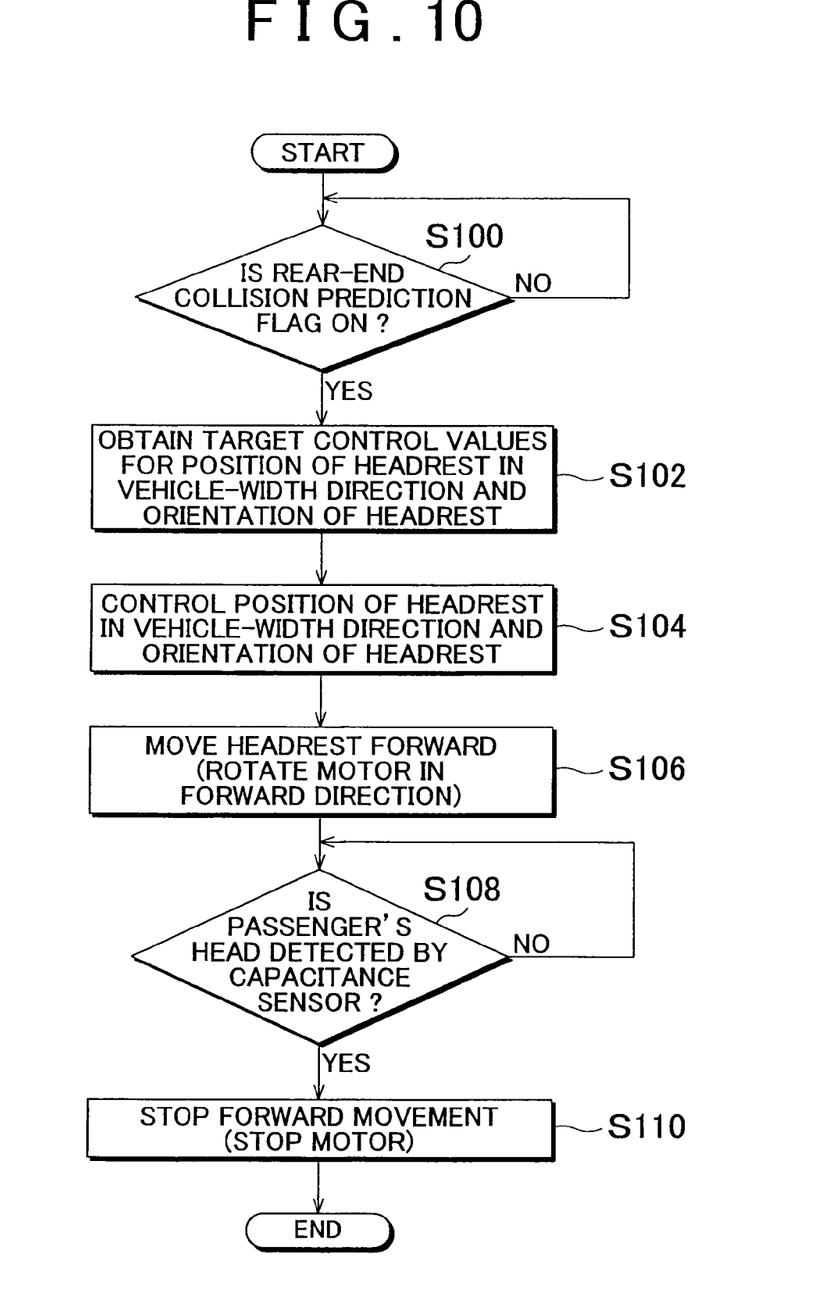
FIG. 10 is a flowchart showing the main routine that is executed by a headrest control ECU according to the embodiment of the invention.

FIG. 10 is a flowchart showing the main routine that is executed by the headrest control ECU 10 according to the embodiment of the invention. The routine shown in FIG. 10 may be executed at the predetermined time intervals during a period from when an ignition switch of the vehicle is turned on until when the ignition switch is turned off.

In step 100 (S100), the headrest control ECU 10 determines whether the rear-end collision prediction flag is on. When the PCS ECU 40 determines that there is a high possibility that a collision between the host vehicle and the subsequent vehicle will occur, the rear-end collision prediction flag is set (turned on), as described above. When it is determined that the rear-end collision prediction flag is on, the headrest control ECU 10 executes step 102 (S102). On the other hand, when it is determined that the rear-end collision prediction flag is off, headrest control ECU 10 ends the routine in the present cycle.

In step 102 (S102), the headrest control ECU 10 receives signals indicating the target control values for the position of the headrest 5 in the vehicle-width direction and the orientation of the headrest 5 from the PCS ECU 40.

In step 104 (S104), the headrest control ECU 10 controls the headrest motor 64 of the headrest rotating mechanism 60 based on the target control values obtained in step 102 (S102). Thus, the position of the headrest 5 in the vehicle-width direction and the orientation of the headrest 5 that correspond to the target control values are achieved.

In step 106 (S106), the headrest control ECU 10 actuates the headrest motor 54 to start the forward movement of the headrest 5 (starts the forward movement control). Namely, when the rear-end collision prediction flag is turned on, the headrest control ECU 10 rotates the headrest motor 54 in the forward direction. Accordingly, the headrest 5 starts moving from the retracted position (normal condition shown in FIG. 2) toward the forward-moved position (operated condition shown in FIG. 2).

In step 108 (S108), during the forward movement control, the headrest control ECU 10 monitors a signal from the capacitance sensor 14, and determines whether the passenger's head is detected by the capacitance sensor 14. In other words, the headrest control ECU 10 determines whether the headrest 5 has reached the appropriate relative position with respect to the passenger's head. The headrest control ECU 10 may determine whether the passenger's head is detected by the capacitance sensor 14 based on, for example, whether the amount of capacitance of the capacitance sensor 14 becomes equal to or larger than a predetermined value that corresponds to the position that is reached immediately before the headrest 5 contacts the passenger's head. In this determination, either one of the absolute capacity and the relative capacity may be used. For example, when the capacitance count value N of the capacitance sensor 14 exceeds a predetermined value, the headrest control ECU 10 may determine that the headrest 5 has reached the appropriate position with respect to the passenger's head. The capacitance count value N means the ratio of the output value $C_0$ from the capacitance sensor 14 to the predetermined reference capacitance Cs. Alternatively, the rate of change in the capacitance B (B=dN/dt) is calculated based on the signal from the capacitance sensor 14. When the rate of change B exceeds a predetermined threshold value, the headrest control ECU 10 may determine that the headrest 5 has reached the appropriate position with respect to the passenger's head. Instead of or in addition to the capacitance sensor 14, a touch sensor, which detects contact between the headrest 5 and the passenger's head, may be provided. When contact between the headrest 5 and the passenger's head is detected, the headrest control ECU 10 may determine that the headrest 5 has reached the appropriate position with respect to the passenger's head. When the headrest control ECU 10 determines in step 108 (S108) that the headrest 5 has reached the appropriate position with respect to the passenger's head, the headrest control ECU 10 executes step 110 (S110). If the headrest control ECU 10 does not determine in step 108 (S108) that the headrest 5 has reached the appropriate position with respect to the passenger's head, the headrest control ECU 10 periodically executes step 108 (S108).

In Step 110 (S110), the headrest control ECU 10 stops the headrest motor 54 to terminate the forward movement of the headrest 5. In other words, the headrest control ECU 10 terminates the movement of the headrest 5 toward the forward-moved position (operated condition in FIG. 2). The forward movement control is completed by the time of a collision at the latest.

Figure 11A:
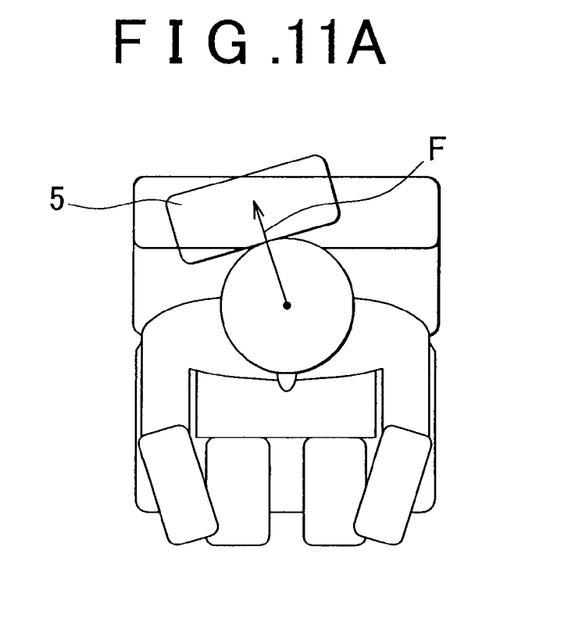
FIG. 11A is a view showing the state in which a passenger's head is held by the headrest according to the embodiment of the invention.
Figure 11B:
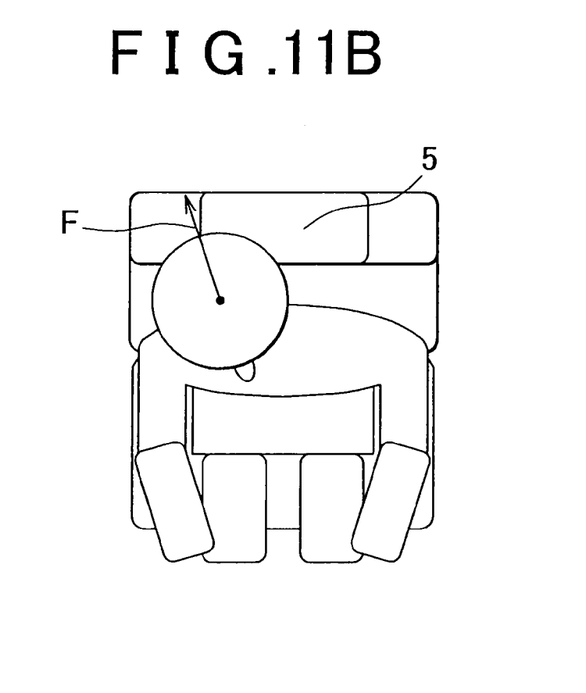
FIG. 11B is a view showing the state in which a passenger's head is held by a headrest according to a comparative example.

FIG. 11A is a view showing the state in which the position of the headrest 5 in the vehicle-width direction and the orientation of the headrest 5 have been controlled. In this state, the headrest control ECU 11 has finished execution of step 110 (S110) in FIG. 10. FIG. 11B is a view showing the state in which neither the position of the headrest 5 in the vehicle-width direction nor the orientation of the headrest 5 have been controlled.

In the case where neither the position of the headrest 5 in the vehicle-width direction nor the orientation of the headrest 5 are controlled, in other words, in the case where only the forward movement control over the headrest 5 is executed, if the inertia force F is applied rearward to the passenger's head in the direction oblique to the longitudinal direction of the vehicle, there is a possibility that the passenger's head is not held appropriately by the headrest, because the headrest is not present in the moving direction of the headrest or only the end portion of the headrest 5 in the width direction of the headrest is present in the moving direction of the headrest.

In contrast, according to the embodiment of the invention described above, the PCS ECU 40 predicts the direction of the inertia force F applied to the passenger's head, and the position of the headrest 5 in the vehicle-width direction and the orientation of the headrest 5 are controlled based on the result of prediction. Therefore, even if the direction of the inertia force F applied to the passenger's head changes, it is always possible to hold the passenger's head with high reliability when a rear-end collision occurs.

The embodiment of the invention has been described in detail. However, the invention is not limited to the embodiment described above. Various modifications and changes may be made to the embodiment of the invention described above without departing from the scope of the invention.

For example, in the embodiment of the invention described before, both the position of the headrest 5 in the vehicle-width direction and the orientation of the headrest 5 are controlled. Alternatively, either one of the position of the headrest 5 in the vehicle-width direction and the orientation of the headrest 5 may be controlled.

In addition, the position of the headrest 5 in the vehicle-width direction and/or the orientation of the headrest 5 may be controlled at multiple stages (with high resolution) or at less stages (with lower resolution). In some cases, the direction of the inertia force F applied to the passenger's head is predicted relatively roughly, for example, it is predicted whether the inertia force F is applied in the obliquely rearward right direction or in the obliquely rearward left direction. In such a case, the target control values ($\alpha$, $\beta$) may be both set to positive predetermined values, when the inertia force is applied to the passenger's head in the obliquely rearward right direction. On the other hand, when the inertia force is applied to the passenger's head in the obliquely rearward left direction, the target control values ($\alpha$, $\beta$) may be both set to negative predetermined values.

In the embodiment of the invention described above, the PCS ECU 40 predicts the direction of the inertia force F applied to the passenger's head and sets the target control values. Alternatively, the headrest control ECU 10 may predict the direction of the inertia force F applied to the passenger's head or set the target control values. Further alternatively, another ECU may predict the direction of the inertia force F applied to the passenger's head or set the target control value.

In the embodiment of the invention described above, first, the position of the headrest 5 in the vehicle-width direction and the orientation of the headrest 5 are controlled, and, then, the forward movement control is executed over the headrest 5. Alternatively, these controls may be executed in parallel (at the same time).

In the embodiment of the invention described above, on the assumption that the center position (or the barycentric position) of the passenger's head in the lateral direction of the passenger's head corresponds to the center position of the headrest 5 in the lateral direction of the headrest 5, the target control values ($\alpha$, $\beta$) are set using the regular position of the headrest 5 as the reference position. Alternatively, if the position of the passenger's head can be detected or predicted by, for example, an in-vehicle camera, the target control values ($\alpha$, $\beta$) may be set based on the detected position of the passenger's head.

In the embodiment of the invention described above, the rearward radar sensor 42 detects the condition of the area behind the vehicle. Alternatively, instead of or in addition to obtainment of the information using the rearward radar sensor 42, the information concerning the positional relationship between the host vehicle and another vehicle may be obtained from the other vehicle via vehicle-to-vehicle communication. Alternatively, the relative speed, the relative distance, and the orientation of the host vehicle with respect to a subsequent vehicle may be detected based on the image recognition information from a stereo camera that captures the image of the area behind the vehicle. Then, it may be determined whether a collision between the host vehicle and the subsequent vehicle is unavoidable. In addition, the determination need not be a determination as to whether a collision is unavoidable or avoidable need not be made. Instead of whether a collision is unavoidable or avoidable, the probability of a collision may be determined.

In the embodiment of the invention described above, only the control over the driver's seat is described. However, the seat to which the invention is applied is not limited to the driver's seat. The invention may be applied to the other seats (the seats for passengers other than the driver).

In the embodiment of the invention, the direction of the inertia force F applied to the passenger, especially to the passenger's head at the time of a rear-end collision may be predicted based on the output values from other sensors such as an accelerator sensor and a yaw-rate sensor.

While the invention has been described with reference to an example embodiment thereof, it is to be understood that the invention is not limited to the example embodiment or constructions. To the contrary, the invention is intended to cover various modifications and equivalent arrangements. In addition, while the various elements of the example embodiment are shown in various combinations and configurations, which are example, other combinations and configurations, including more, less or only a single element, are also within the spirit and scope of the invention.

What is claimed is:

1. A headrest control apparatus, comprising:
   a headrest moving mechanism that supports a headrest in such a manner that the headrest is allowed to rotate about an axis of the headrest, which extends in a height direction of a vehicle;
   an actuator that generates drive power used to rotate the headrest;
   a headrest control unit that controls an orientation of the headrest by operating the actuator; and
   an inertia force direction prediction unit that predicts a direction of an inertia force applied to an occupant in the vehicle when a collision to a rear portion of the vehicle occurs,
   wherein the headrest control unit calculates a target value for a rotation amount of the headrest based on an angle between the direction of the inertia force predicted by the inertia force direction prediction unit and a longitudinal axis of the vehicle, and rotates the headrest based on the calculated target value.

2. A headrest control apparatus, comprising:
   a headrest moving mechanism that supports a headrest in such a manner that the headrest is allowed to move in a width direction of a vehicle;
   an actuator that generates drive power used to move the headrest;
   a headrest control unit that controls a position of the headrest in the vehicle width direction by operating the actuator; and
   an inertia force direction prediction unit that predicts a direction of an inertia force applied to an occupant in the vehicle when a collision to a real portion of the vehicle occurs,
   wherein the headrest control unit changes the position of the headrest in the vehicle width direction in such a manner that a center position of the headrest in a lateral direction of the headrest is located on a line extending in the direction in which the inertia force is applied, which is predicted by the inertia force direction prediction unit.

3. The headrest control apparatus according to claim 1, wherein the inertia force direction prediction unit predicts the direction of the inertia force applied to the occupant in the vehicle when the collision to the rear portion of the vehicle occurs based on a resultant of an impact force and a centrifugal force that are produced when the collision to the rear portion of the host vehicle occurs.

4. The headrest control apparatus according to claim 2, wherein the inertia force direction prediction unit predicts the direction of the inertia force applied to the occupant in the vehicle when the collision to the rear portion of the vehicle occurs based on a resultant of an impact force and a centrifugal force that are produced when the collision to the rear portion of the host vehicle occurs.

* * * * *